Sept. 11, 1928.

B. G. HOWE 1,683,675

BREAD BASKET RACK

Filed Nov. 4, 1927

Inventor
B. G. Howe
by his Attorneys
Baldwin Wight

Patented Sept. 11, 1928.

1,683,675

UNITED STATES PATENT OFFICE.

BARTLETT G. HOWE, OF GALESBURG, ILLINOIS, ASSIGNOR TO HOWE-ANDERSON COMPANY, OF GALESBURG, ILLINOIS, A CORPORATION.

BREAD-BASKET RACK.

Application filed November 4, 1927. Serial No. 231,026.

This invention relates to a rack for the purpose of supporting a basket of bread and at the same time displaying an advertisement, and the rack is so constructed that the bread and the advertisement will both be visible to an observer at the same time, whatever may be the angle of the line of vision. The rack is composed of two pairs of side pieces pivotally connected in such manner that when not in use it can be folded readily to a flat position for shipment. Other detailed features of the invention will be apparent from the following description and the appended claims.

In the drawings, Figure 1 is a perspective view of the rack in operative position showing in dotted lines the position taken by a basket of bread supported by said rack.

Figure 1:
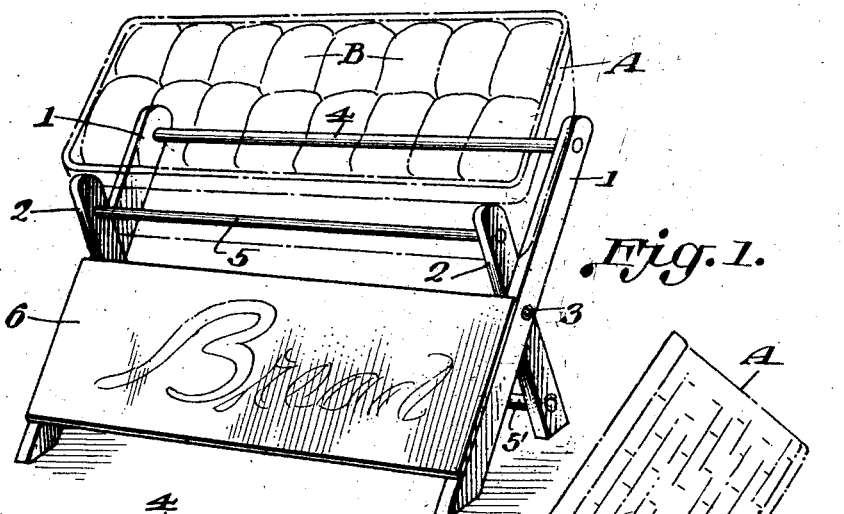
Figure 2:
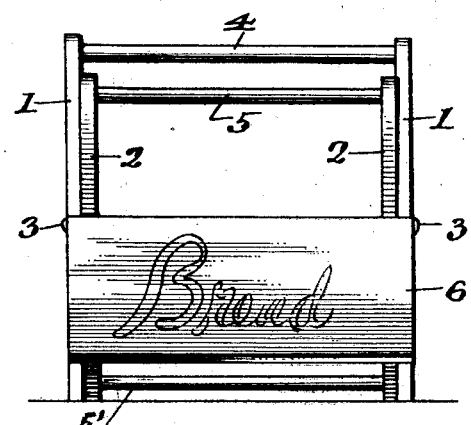
Figure 2 is a front view of the rack.

The rack is composed of two side members 1 and two side members 2 which are considerably shorter than the members 1. These members are pivoted together at each side by suitable pivots 3, so that the side members 2 lie inside of the members 1. Near their upper ends the side members 1 are connected by a rod or bar 4, and the side members 2 are similarly connected by a rod or bar 5, and by a rod or bar 5′ at the bottom.

The side members 1 below the pivot points 3 on the outside of the short members are connected by a relatively large board 6 upon which may be placed any desired advertisement. The upper edge of this board acts as stops for the members 2 in their movement to the operative position of Figure 1. When the device is folded, the side members 2 fit snugly inside of the members 1, this folding movement being permitted by the fact that the side members 2 are shorter than the members 1, so that the rod 5 lies inside of the rod 4. The movement to folded position is limited by the sides of the members 2 coming in contact with the surface of the board 6.

Figure 3:
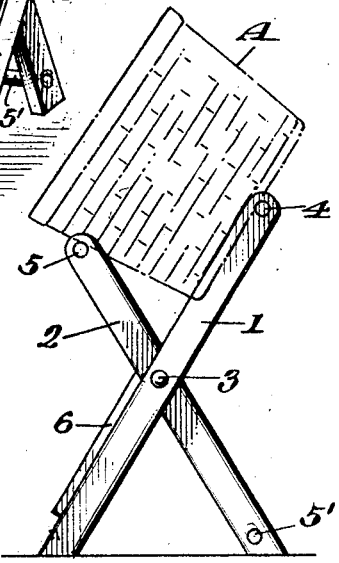
Figure 3 is an end view of the rack.
Figure 4:
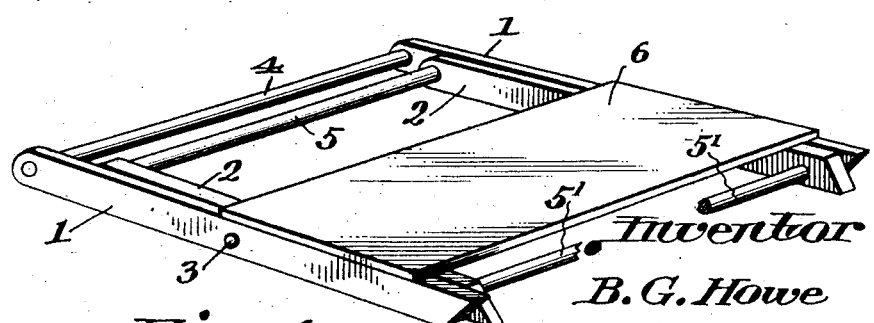
Figure 4 is a perspective view showing the rack in collapsed position.

When the device is in the position shown in Figure 1, a bread basket A of large size may be supported in the manner shown. A basket of smaller size may be supported solely by the rods 4 and 5, as indicated in Figure 3. It is to be noted that the base of the basket will be supported in a plane parallel to the plane of the board 6 so that both the bread B in the basket and the advertising matter on the board 6 will be simultaneously visible to the customer from any point of view. The provision of the connecting rods 4 and 5 which act as supports for the basket enable the rack to be used in connection with baskets of any desired length, and also with baskets which may vary greatly in their other dimensions. Obviously, the lower ends of the members 1 and 2 will be cut at such angle that the ends will fully engage the support when the rack is in its open position. Similarly, the upper edge of the board 6 will be cut at such angle that it will contact fully with the members 2 when the rack is in its operative position.

It is obvious that the structure provides a very simple and efficient device for supporting a basket of bread, regardless of the particular size and shape of said basket, and at the same time presenting advertising matter in such position that it will be brought to the notice of any one looking at the bread in the basket. It is also apparent that the particular construction permits the rack to be folded into very compact position for shipment, but that it can be moved to operative position without any assembly or the necessity for employing tools. Details of the construction may be changed without departing from the spirit of the invention, which is to be regarded as limited only by the scope of the appended claims.

I claim as my invention:

1. A basket rack comprising at each side a pair of pieces pivotally connected intermediate their ends, the inner piece of each pair above the pivot being shorter than the other, a bar connecting the upper ends of the short pieces, a bar connecting the upper ends of the long pieces, and a board connecting the long pieces below the pivots and acting to limit the movement of the short pieces about the pivots in either direction, whereby a supported basket will be displayed at substantially the angle of said board and its contents observed simultaneously with the board.

2. A basket rack comprising at each side a pair of pieces pivotally connected intermediate their ends, a bar connecting the upper end of the outer pieces of each pair, a similar bar connecting the upper ends of the inner pieces of each pair, the inner pieces above their pivots being sufficiently shorter than the outer pieces to permit their connecting bar to lie under the other connecting bar when the parts are folded, and a relatively broad member adapted to contain advertising matter connecting the outer pieces below their pivots in position to engage and limit the movement of the inner pieces about the pivots in either direction, whereby a supported basket will be displayed at substantially the angle of said board and its contents observed simultaneously with the board.

3. A bread basket rack comprising at each side a pair of pieces pivotally connected intermediate their ends, a rod connecting the upper ends of the outer pieces of each pair, a similar rod connecting the upper ends of the inner pieces of each pair, said inner pieces above the pivot points being shorter than the outer, and a relatively broad member connecting the outer pieces below their pivots and adapted to contain advertising matter, this member limiting the opening movement of the rack to such position that a basket of bread supported by said rods will occupy the same angle to the vertical as the face of said broad member.

In testimony whereof I have hereunto subscribed my name.

BARTLETT G. HOWE.